United States Patent [19]

Nilssen

[11] E Patent Number: Re. 32,155

[45] Reissued Date of Patent: May 20, 1986

[54] HIGH-EFFICIENCY TUNED INVERTER CIRCUIT

[76] Inventor: Ole K. Nilssen, Caesar Dr., R.R.-5, Barrington, Ill. 60010

[21] Appl. No.: 475,134

[22] Filed: Mar. 14, 1983

Related U.S. Patent Documents

Reissue of:

[64] Patent No.: 4,257,088
Issued: Mar. 17, 1981
Appl. No.: 33,335
Filed: Apr. 25, 1979

[51] Int. Cl.[4] ..... H02M 3/335

[52] U.S. Cl. ..... 363/18; 315/243; 331/117 R

[58] Field of Search ..... 363/15, 18, 19, 75, 363/131; 331/108 R, 112, 117 R; 315/232, 243, DIG. 5, DIG. 7

[56] References Cited

U.S. PATENT DOCUMENTS

| | | | |
|---|---|---|---|
| 3,320,510 | 5/1967 | Locklair | 363/45 |
| 3,434,009 | 3/1969 | Nilssen | 315/209 |
| 3,479,509 | 11/1969 | Grundy et al. | 331/112 |
| 3,697,851 | 10/1972 | Mast | 363/19 |
| 3,753,075 | 8/1973 | Tomura et al. | 363/131 |
| 3,987,355 | 10/1976 | Hull | 363/15 |
| 4,075,476 | 2/1978 | Pitel | 315/278 |

*Primary Examiner*—Patrick R. Salce
*Assistant Examiner*—Anita M. Ault

[57] ABSTRACT

A simple single-ended inverter circuit efficiently converts a DC input voltage to an AC output voltage. The circuit, which functions as a self-contained Class C oscillator, comprises an energy-storing inductor and an energy-storing tank capacitor in circuit with a saturable core feedback transformer operable to provide intermittent feedback current to effect periodic conduction of a single power transistor. When this transistor is non-conductive, resonant interchange of energy occurs between the inductor and tank capacitor; periodic energy transfer from the inductor both charges the capacitor and also supplies a load, and energy transfer from the capacitor to the inductor provides reset current to the saturable transformer.

15 Claims, 2 Drawing Figures

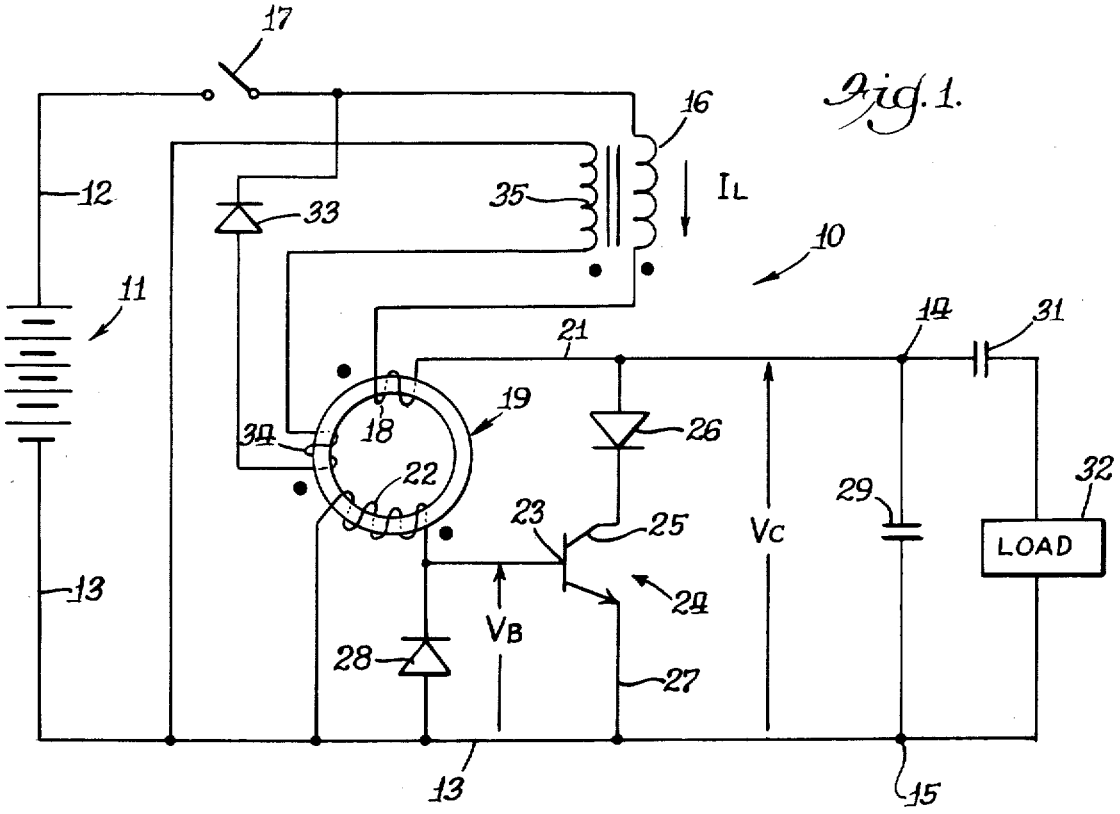
Fig. 1.
Fig. 2.
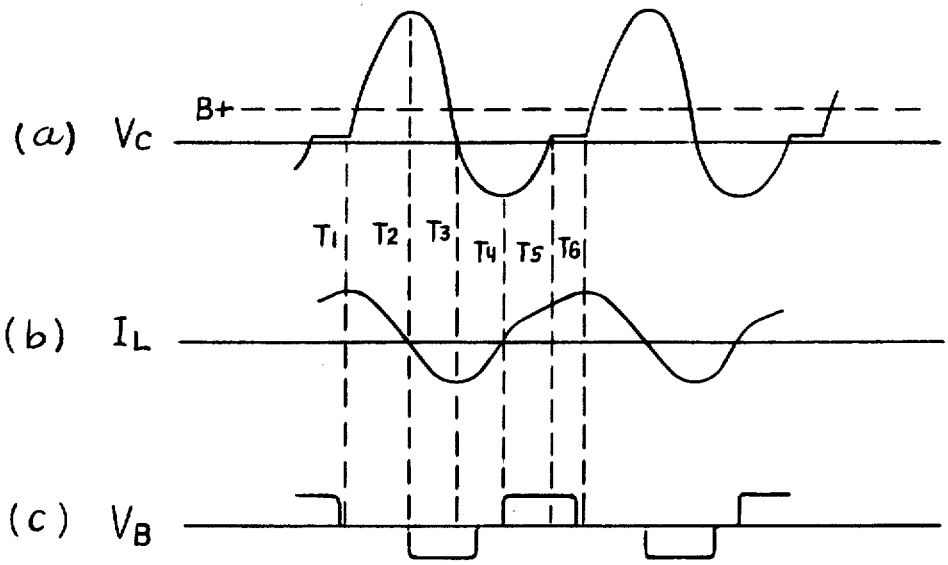

HIGH-EFFICIENCY TUNED INVERTER CIRCUIT

Matter enclosed in heavy brackets [ ] appears in the original patent but forms no part of this reissue specification; matter printed in italics indicates the additions made by reissue.

BACKGROUND OF THE INVENTION

The present invention relates in general to electrical energy conversion devices and, more particularly, to electrical inverter circuits for converting DC voltage into AC voltage.

DESCRIPTION OF THE PRIOR ART

As is known in the art, inverter circuits are employed to convert a DC input voltage into an AC output voltage. It is also known that Class C oscillator circuits are useful energy conversion devices because of their relatively high efficiencies. However, applicant is not aware of any prior art self-oscillating Class C oscillator containing a single transistor to achieve high-efficiency DC to AC energy conversion.

SUMMARY OF THE INVENTION

The present invention provides a relatively simple and cost-effective high-efficiency single-ended inverter circuit operable to convert a DC input voltage, typically on the order of 12 volts, into an AC output voltage of several hundred volts in magnitude. The present invention comprises an energy-storing inductor and an energy-storing tank capacitor in circuit with a saturable core feedback transformer operable to provide intermittent feedback current to effect periodic conduction of a single power transistor. When this transistor is non-conductive, resonant interchange of energy occurs between the inductor and tank capacitor; periodic energy transfer from the inductor charges the capacitor and also supplies a load, and periodic energy transfer from the capacitor to the inductor provides a reset current to the saturable transformer.

It is therefore an important object of the present invention to provide a DC to AC energy conversion circuit which is relatively simple in design and inexpensive to manufacture.

Another important object of the present invention is to provide a self-contained or self-oscillating Class C oscillator circuit operable to achieve highly efficient DC to AC energy conversion.

Yet another important object of the present invention is to provide a high-efficiency single-ended inverter circuit comprising one transistor to which intermittent feedback current is supplied to effect periodic transistor conduction.

These and other objects of the present invention will become apparent from the following description which, when taken in conjunction with the accompanying drawings, discloses a preferred embodiment of the invention.

BRIEF DESCRIPTION OF THE DRAWINGS

FIG. 1 is a schematic diagram of a preferred embodiment of the inverter circuit of the present invention;

FIGS. 2(a), (b) and (c) illustrate typical waveforms of the tank capacitor voltage, the inductor current and the transistor base voltage respectively, for the inverter circuit of FIG. 1.

DESCRIPTION OF THE PREFERRED EMBODIMENT

With reference to FIG. 1, an inverter circuit generally designated by reference numeral 10 is connected to a unidirectional voltage input, typically on the order of 12 volts, provided by a battery 11 to positive and negative leads 12, 13, respectively. This DC voltage is converted into an alternating voltage, typically on the order of several hundred volts, at an output taken across terminals 14, 15. Rectified line voltage may be provided as an alternative to the battery 11. The circuit 10 functions as a Class C oscillator.

Considering first its structural components, the inverter circuit 10 comprises an energy-storing inductor means such as a transformer winding 16 having one end thereof connected to positive lead 12 through a switch 17 and having another end thereof connected to a primary winding 18 of a known saturable core transformer means 19. The other end of the primary winding 18 is connected to an output lead 21 which is, in turn, connected to output terminal 14. The negative battery lead 13 is connected directly to the other AC ouptut terminal 15.

The saturable core transformer 19 has a secondary winding 22 having one end thereof directly connected to lead 13 and another end connected to a base or control element 23 of a power transistor means 24 in order to provide intermittent feedback current to the base when positive inductor current, taken in the direction of the arrow designated $I_L$ adjacent inductor 16, is flowing. Transistor 24 has a collector 25 connected to the cathode of a rectifier or diode means 26, the anode thereof being connected to the output lead 21. Transistor 24 has an emitter 27 connected directly to the negative battery lead 13. A diode 28 has an anode connected to lead 13 and a cathode connected to the base terminal 23 of the transistor 24 for a purpose to be described.

An energy-storing tank capacitor means 29 is connected across the terminals 14, 15 and in parallel with the series-connected transistor 24 and rectifier 26. As will be explained, when transistor 24 is non-conductive, resonant interchange of energy occurs between the inductor 16 and the tank capacitor 29. A coupling capacitor 31 having a value much smaller than that of the tank capacitor 29 connects the output terminal 14 to a load 32, which may be resistive, capacitive or inductive. For example, the load 32 may comprise a ballast for a fluorescent lamp or a capacitive electro-luminescent panel.

Finally, a clamping circuit, utilized for a purpose to be described, comprises a diode 33 in series with another winding 34 on transformer 19 and a winding 35 tightly coupled to winding 16. Diode 33 is connected to the switched positive output of battery 11 and winding 35 is connected to the ground lead 13. Windings 16 and 35 preferably comprise a bifilar transformer.

The operation of the circuit of FIG. 1 is best understood with additional reference to FIGS. 2(a), (b) and (c), which illustrate typical waveforms of the capacitor 29 voltage $V_C$, the inductor 16 current $I_L$ and the base 23 voltage $V_B$, respectively, which are taken as positive in the directions denoted by the conventional arrows in FIG. 1.

Upon closing of the switch 17, the circuit begins to oscillate. If rectified line voltage is substituted for the battery 11, a known Diac starting circuit (not shown) will be required to initiate oscillation. Considering the time period just prior to $T_1$, when the transistor 24 is conductive, it will remain in this condition as long as positive feedback current is supplied to its base 23 by means of the secondary winding 22 of the saturable core transformer 19. At time $T_1$, the saturable core transformer 19 becomes saturated and the positive feedback supplied by its secondary winding 22 ceases, causing the transistor 24 to become non-conductive.

During the period between $T_1$ and $T_2$, energy stored in the inductor 16 as a result of positive current flowing through it is transferred to the resonant tank capacitor 29 and also to the load 32 through capacitor 31, with the result that capacitor 29 begins to charge; this flow of current will continue until all of the energy stored in the inductor 16 has been discharged, which occurs at time $T_2$.

At the time $T_2$, the voltage $V_C$ reaches a value much higher than that of the B+ voltage of the battery and the tank capacitor 29 begins to discharge its stored energy back into the inductor 16, causing a reverse current to flow through the inductor and the series-connected primary winding 18 of the saturable core transformer 19. This reverse current causes the magnetic core of the saturable core transformer 19 to be reset, thereby making the transformer ready for a new forward feedback cycle.

This reverse current, will continue to flow until time $T_4$, when inductive energy has again been transferred to the capacitor 29. At this point, the capacitor 29 voltage $V_C$ reaches its maximum negative value. After $T_4$, positive current $I_L$ starts flowing through the inductor 16. As a result, the feedback transformer 19 will now supply feedback currnt to the base 23 of transistor 24, causing it to become conductive.

The voltage $V_B$ on the base 23 of transistor 24 is illustrated in FIG. 2(c). The diode 28 prevents the base voltage $V_B$ from exceeding the breakdown level when the core of the saturable core transformer 19 is being reset.

The purpose of the rectifier 26 is to permit the voltage $V_C$ to reach negative values. It will be appreciated that this operation is more advantageous than that of typical prior art Class C oscillator circuits which do not permit instantaneous negative output voltage. If the load requirements are such that a negative $V_C$ is not necessary, this rectifier may be eliminated.

It is important that the saturable core transformer 19 remain unsaturated long enough for $V_C$ to reach a slightly positive value, which occurs at time $T_5$. This positive voltage is equal to the forward drop of diode 26 plus the collector-emitter voltage of transistor 24. In fact, to insure cyclic energy addition to the oscillating circuit, the saturable core transformer 19 should remain unsaturated for a short time period, that is, until time $T_6$. Of course, the longer transformer 19 remains unsaturated, the more energy is supplied to the oscillator circuit 10 during each cycle. Therefore, the output power of the oscillator 10 can be adjusted by varying the number of turns on the secondary 22 of the transformer 19.

The clamping circuit comprises diode 33 and windings 34 and 35 will prevent $V_C$ from rising to excessive levels under no-load conditions, the clamping energy being returned to the battery power supply 11.

It is thought that the present invention and many of its attendant advantages will become apparent from the foregoing description and it is apparent that various changes may be made in the form, construction and arrangement of its component parts without departing from the spirit and scope of the invention or sacrificing any of its material advantages, the form described being merely a preferred embodiment of the invention.

The embodiments of the invention in which an exclusive property or privilege is claimed are defined as follows:

1. In a single-ended Class C oscillator having a tuned L-C tank circuit, the improvement comprising:

power transistor means having a control element; and saturable core feedback transformer means for supplying intermittent feedback signals to the control element of the transistor means in order to effect periodic transistor means conduction.

2. The oscillator of claim 1 wherein the feedback transformer means comprises a current transformer.

3. An inverter circuit connected to a unidirectional voltage at an input and being operable to provide an alternating voltage at an output, comprising:

energy-storing inductor means connected to the voltage input;

power transistor means having a control element;

saturable core feedback transformer means having a primary winding in circuit with the inductor means and the transistor means and having a secondary winding for providing intermittent feedback current to the control element of the transistor means in order to effect periodic transistor means conduction; and energy-storing tank capacitor means in circuit with the power transistor means and the output for interchange of energy with the inductor means when the transistor means in non-conductive, discharge of the capacitor means serving to provide periodic reset current to the saturable transformer means.

4. The inverter circuit of claim 3 and rectifier means in series with the transistor means.

5. The inverter circuit of claim 3 and diode means connected to the control element of the transistor means in order to limit the maximum control element voltage to a predetermined level.

6. An inverter circuit connected to a DC voltage at an input and being operable to provide an AC voltage at an output connected to a load comprising:

energy-storing inductor means connected to the voltage input;

power transistor means having a base, an emitter and a collector;

saturable core feedback transformer means having a primary winding in series with the inductor means and the transistor means and having a secondary winding connected in circuit with the base-emitter junction thereof in order to provide intermittent feedback current thereto in order to effect periodic transistor means conduction; and energy-storing tank capacitor means connected in parallel with the power transistor means and the output for interchange of energy with the inductor means when the transistor means is non-conductive;

whereby periodic energy transfer from the inductor means serves to charge the capacitor means and supply energy to the load and periodic energy transfer from the capacitor means to the inductor means serves to provide reset current to the saturable transformer means.

7. The inverter circuit of claim 6 and rectifier means in series with the transistor means.

8. The inverter circuit of claim 6 and diode means connected across the base-emitter junction of the transistor means in order to limit the control element voltage to a predetermined level.

9. The inverter circuit of claim 6 and a capacitor for coupling the load to the inverter output.

10. The inverter circuit of claim 6 and clamping means in circuit with the inverter input for limiting the value of the instantaneous positive output voltage.

11. The inverter circuit of claim 10 wherein the clamping means comprises a transformer winding tightly coupled to the inductor means.

12. The inverter circuit of claim 10 wherein the clamping means comprises a clamping transformer winding tightly coupled to the inductor means and further comprises an additional winding on the feedback transformer means in circuit with the clamping transformer winding and the inverter circuit input.

13. An inverter circuit connected to a DC voltage input and being operable to provide a segmented sine wave voltage output, comprising:

at least one power transistor means comprising a base, an emitter and a collector;

tank circuit means in circuit with the transistor means and the output and comprising an inductor and a capacitor operable to interchange energy when the transistor means is non-conductive; and means for providing drive current to the transistor means to effect periodic conduction thereof, each conduction period being initiated when the emitter-collector voltage of the transistor means is substantially zero in magnitude.

14. The inverter circuit of claim 13 wherein the drive current means is operable to effect transistor means conduction once during each full cycle of the voltage output.

*15. An inverter circuit adapted to provide an AC output voltage and comprising:*

*semiconductor switching means connected with a source of DC voltage as well as with a tank circuit means, said switching means having control terminals and output terminals, said control terminals being provided with a signal operative periodically and alternatingly to render said switching means in an ON-state and in an OFF-state, said ON-state being characterized by an ON-time during which the switching means exhibits a relatively low resistance to the flow of electric current, said OFF-state being characterized by an OFF-time during which said switching means exhibits a relatively high resistance to the flow of electric current, said tank circuit means: (i) having an inductor and a capacitor operable to resonantly interact, (ii) having a natural resonance frequency, (iii) being operative to cause the AC output voltage to be, at least in part, sinusoidal in waveshape, independent of frequency, and (iv) being connected with said output terminals; and*

*saturable reactor means connected in circuit between said output terminals and said control terminals and operative: (i) to provide said signal, and (ii) by way of its saturation characteristics, to determine the duration of said ON-time.*

* * * * *